United States Patent [19]
Noguchi

[11] Patent Number: 5,500,849
[45] Date of Patent: Mar. 19, 1996

[54] CONSTRUCTION OF OPTICAL DISK

[75] Inventor: Masato Noguchi, Tokyo, Japan

[73] Assignee: Asahi Kogaku Kogyo Kabushiki Kaisha, Tokyo, Japan

[21] Appl. No.: 193,527

[22] Filed: Feb. 8, 1994

Related U.S. Application Data

[63] Continuation of Ser. No. 107,165, Aug. 17, 1993, Pat. No. 5,365,504, which is a continuation of Ser. No. 781,413, Oct. 23, 1991, abandoned.

[30] Foreign Application Priority Data

Oct. 23, 1990 [JP] Japan ..................... 2-286439
Mar. 5, 1991 [JP] Japan ..................... 3-123235

[51] Int. Cl.$^6$ ..................................... G11B 7/24
[52] U.S. Cl. ................... 369/275.4; 369/275.1; 369/109; 369/100
[58] Field of Search ............ 369/275.1, 275.2, 369/275.3, 275.4, 100, 109, 110, 58, 44.37

[56] References Cited

U.S. PATENT DOCUMENTS

| | | |
|---|---|---|
| 4,797,868 | 1/1989 | Ando . |
| 4,812,638 | 3/1989 | Ogata et al. . |
| 4,839,882 | 6/1989 | Janssen ........................ 369/275.1 |
| 4,866,688 | 9/1989 | Ohtake et al. . |
| 4,956,833 | 9/1990 | Kokado et al. . |
| 5,031,162 | 7/1991 | Morimoto et al. .............. 369/275.1 |
| 5,091,900 | 2/1992 | LaBudde ........................ 369/275.1 |
| 5,168,490 | 12/1992 | Braat ............................. 369/275.1 |
| 5,280,464 | 1/1994 | Itoh et al. . |

FOREIGN PATENT DOCUMENTS

| | | |
|---|---|---|
| 0439100 | 7/1991 | European Pat. Off. . |
| 3414052 | 10/1984 | Germany . |
| 62-40622 | 2/1987 | Japan . |
| 62-79241 | 3/1987 | Japan . |
| 63-244416 | 2/1989 | Japan . |

*Primary Examiner*—Georgia Y. Epps
*Assistant Examiner*—Muhammad N. Edun
*Attorney, Agent, or Firm*—Sandler, Greenblum, & Bernstein

[57] ABSTRACT

An optical disk apparatus is provided which includes an incident light optical system which causes a light beam, having a wavefront aberration in which an odd function component with respect to two perpendicular axes corresponding to the radial and tangential directions of an optical disk is contained, to impinge on the disk. The apparatus further comprises a light detecting unit divided into at least two regions by a boundary line corresponding to the radial direction of the optical disk for detecting a light beam guided from the disk, and a computing mechanism which outputs a tracking error signal by computing the output differential between these two or more regions.

7 Claims, 15 Drawing Sheets

5,500,849

CONSTRUCTION OF OPTICAL DISK

This application is a continuation of application Ser. No. 08/107,165, filed Aug. 17, 1993, now U.S. Pat. No. 5,365, 504, which is a continuation of application Ser. No. 07/781, 413, filed Oct. 23, 1991, now abandoned.

BACKGROUND OF THE INVENTION

1. Field of the Invention

This invention concerns an optical disk apparatus suitable for detecting tracking error signals by the push-pull method, and the construction of an optical disk suitable for detecting tracking error signals by the push-pull method and focusing error signals by the astigmatism method.

2. Description of the Prior Art

FIG. 19 shows a conventional optical disk apparatus. A light beam from a laser light source 1 advances via a collimator lens 2, a mirror 3 and an objective lens 4 so as to form a spot on an optical disk OD. Light reflected from the optical disk OD passes through a beam splitter 5 and a condensing lens 6 to a photodetector 7. The objective lens 4 and the mirror 3 are installed in a head 8 which is free to slide in the radial direction of the optical disk, all devices from the laser light source 1 to the beam splitter 5 being fixed.

The photodetector 7, as shown in FIG. 20, comprises two regions A, B divided by a boundary line corresponding to the tangential direction of the optical disk, the difference between the output from these two regions A, B giving a tracking error signal according to the push-pull method.

The distribution of reflected light condensed on the photodetector 7 varies due to diffraction produced by the positional relationship of the pits or grooves and the spot on the optical disk.

FIG. 21 shows the light distribution on the photodetector when a light beam with no aberration is incident. In the figure, the x axis corresponds to the radial direction and the y axis to the tangential direction of the optical disk.

FIG. 21(a), (b) and (c), respectively, show the light distribution on the photodetector in (a) the case wherein the spot on the optical disk is shifted in the +x direction from the center of a track; (b) the case wherein the spot is in the center of a track; and (c) the case wherein the spot on the optical disk is shifter in the −x direction from the center of a track. The variation of the light distribution due to a tracking error is asymmetrical only in the radial direction, and it is symmetrical in the tangential direction.

As the light distribution varies in this manner, it is possible to detect a shift between the spot and a track in the x direction, i.e. a tracking error, by measuring the difference of output from the two regions A, B of the photodetector 7.

the mirror 3 is free to rotate in the direction of the arrow in FIG. 19 and its angle is controlled by means of the tracking error such that the spot on the optical disk is in the center of a track.

In the aforesaid conventional optical disk apparatus, however, the balance i the light detected in each photodetecting region may be upset and the tracking error signal may contain an offset in addition to the ordinary even if there is no change in the light distribution. An offset is produced when the entire spot on the photodetector is displaced due to the displacement of the optical path of the reflected light beam when the light beam is inclined relative to the optical disk as a result of a deformation of the disk or an inclination of the beam, and the displacement includes a component in a direction corresponding to the radial direction of the disk.

Further, when the mirror 3 is inclined without moving the head 8 so that the spot is moved in a radial direction, the optical path of the reflected light beam is shifted by an amount compared to the case when the mirror is in its reference position as shown in FIG. 22. The entire spot on the photodetector is then displaced from the reference position shown by the solid line to the position shown by the broken line in FIG. 23, and the tracking error signal will contain an offset.

FIG. 24 is a graph showing the relation between the position of the spot on a disk relative to a track, and the tracking error signal. The horizontal axis is the shift amount of the center of a spot from the center of a track, and the vertical axis is the tracking error signal TE. The solid line in the figure shows the tracking error signal when the light beam is reflected vertically from the optical disk, and the broken line shows the tracking error signal when the mirror 3 is inclined and the spot on the disk is shifted by 10 tracks from the aforesaid track.

If the optical disk and light beam are inclined relative to each other, the tracking error signal curve is shifted overall as the mirror inclination angle increases, and the actual shift amount and the signal do not correspond. Even if a servo-controller based on the tracking error signal is used, therefore, the position of the spot cannot be accurately controlled.

SUMMARY OF THE INVENTION

This invention was conceived to overcome the above problems. It aims to provide an optical disk apparatus and an optical disk wherein the tracking error can be detected accurately even if the optical disk and light beam are inclined relative to each other.

The optical disk apparatus of this invention is characterized in that it comprises an incident light optical system which causes a light beam, having a wavefront aberration in which an odd function component with respect to both the radial direction and the tangential direction of the disk is contained, to impinge on a disk, a photodetecting unit which splits a light beam guided from the disk to the unit into at least two regions divided by a boundary line corresponding to the radial direction of the disk, and computational means which outputs a tracking error signal by computing the difference between the output from the two regions of the photodetecting unit.

Further, the optical disk according to the present invention is characterized in that if the optical disk is considered as a diffraction grating, the phase difference P of first order scattered light with respect to zero order scattered light is given by $P=N\pi$ (where N is an integer).

BRIEF DESCRIPTION OF THE DRAWINGS

FIG. 1 is a schematic diagram illustrating the photodetecting regions on a photodetector and a signal processing circuit.

DETAILED DESCRIPTION OF THE EMBODIMENTS

The embodiments of the present invention will now be described hereinafter with reference to the drawings. The present disclosure relates to subject matter contained in Japanese patent application Nos. H2-286439 (filed on Oct. 23, 1990) and H3-123235 (filed on Mar. 5, 1991) which are expressly incorporated herein by reference in their entireties.

EMBODIMENT 1

FIGS. 1 to 4 illustrate a first embodiment of the present invention. In the first embodiment, this invention is applied in a read only type optical disk apparatus.

Figure 1:
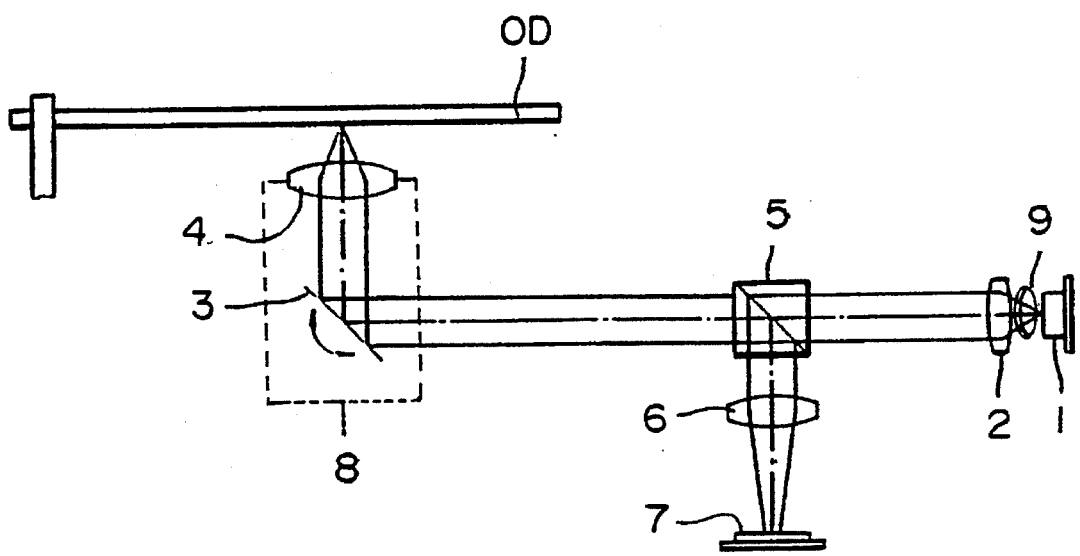
FIG. 1 is a schematic digram illustrating a first embodiment of the optical disk apparatus according to the present invention.

As shown in FIG. 1, a light beam emitted by a laser light source 1 advances via a collimator lens 2, a mirror 3 and an objective lens 4 so as to form a spot on an optical disk OD. The light beam reflected from the optical disk OD passes through a base splitter 5 and a condensing lens 6 to a photodetector 7. A flat plate 9 with parallel surfaces which confers wavefront aberration having an odd function component on the light beam is interposed between the laser light source 1 and the collimator lens 2.

In the case of astigmatism, the wavefront aberration may be typically represented by the difference of curvature of the wavefront on two perpendicular axes x, y (9°, 90°) where the x axis is the radial direction and the y axis is the tangential direction of the optical disk, and by the difference of curvature on two perpendicular axis ±45° derived by rotating the original axes. The flat plate 9 with parallel surfaces shown in this embodiment is arranged at an inclination to the optic axis such that it generates a wavefront aberration on the perpendicular axes ±45°.

The objective lens 4 and the mirror 3 are installed in a head 8 such that they are free to slide in the radial direction of the optical disk. With all devices from the laser light source 1 to the beam splitter 5 being fixed.

Figure 2:
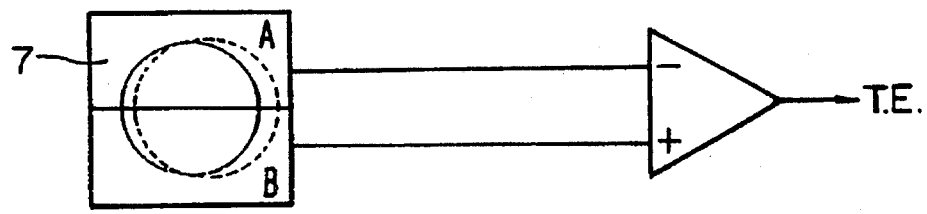

The photodetector 7 is provided to detect a tracking error signal. As shown in FIG. 2, its light detecting area is divided into two regions A, B by a boundary line corresponding to the radial direction of the optical disk.

Figure 3A:
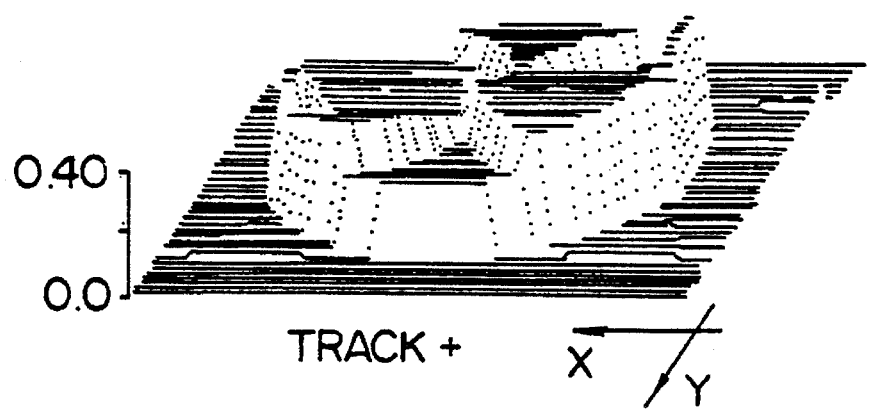
FIGS. 3(a), 3(b), 3(c) are graphs showing the light distribution on the photodetector.
Figure 3B:
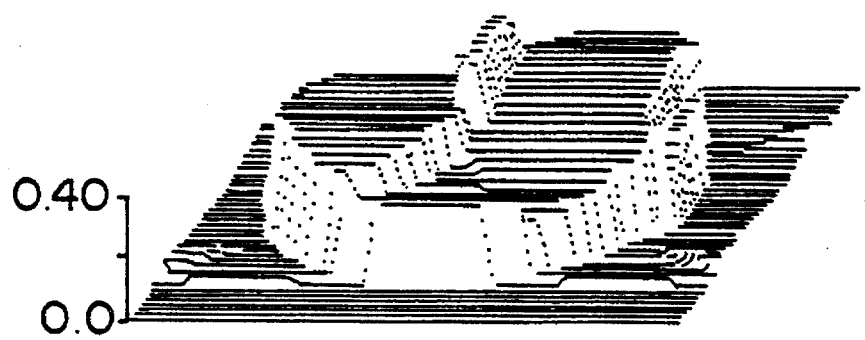
Figure 3C:
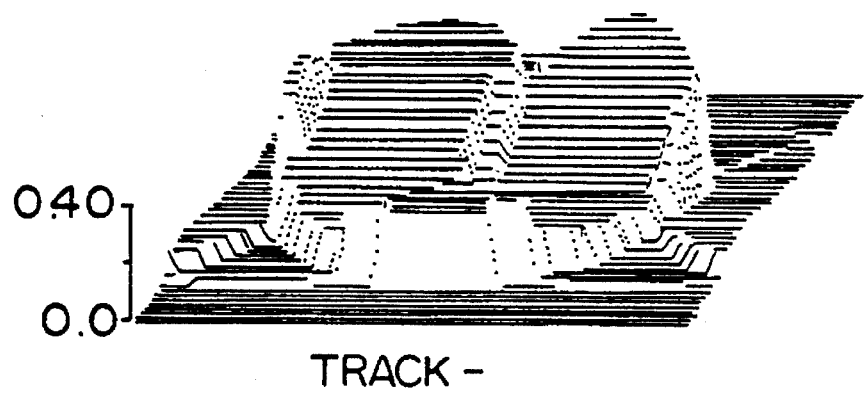

FIG. 3 shows the light distribution on the photodetector when a light beam with astigmatism in the ±45° directions is caused to impinge on the optical disk. In the figure, the X axis corresponds to the radial direction, and the Y axis corresponds to the tangential direction. FIG. 3(a), (b) and (c), respectively, show the light distribution on the photodetector in: (a) the case wherein the spot on the optical disk is shifted in the +x direction from the center of a track: (b) the case wherein the spot is in the center of a track: and (c) the case wherein the spot on the optical disk is shifted in the −x direction from the center of a track. The variation of the light distribution due to a tracking error is asymmetrical in both the radial and tangential directions due to the shift of the spot.

A tracking error is therefore detected if the two regions of the photodetector 7 are divided by a boundary line in the tangential direction as in the conventional case, or if the two regions of the photodetector 7 are divided by a boundary line in the radial direction as in this embodiment.

The tracking error signal TE is detected by subtracting outputs from the two regions A and B as follows.

$$TE=B-A$$

In the cases of FIG. 3(a), (b) and (c), the tracking error signal TE becomes as follows:

(a) TE=B−A>0

(b) TE=B−A=0

(c) TE=B−A<0

If the two regions of the photodetector 7 are divided by a boundary line in the radial direction, even if the mirror 3 is inclined so as to shift the spot on the optical disk, the tracking error signal TE does not contain an offset as the spot on the photodetector moves along the boundary line in the radial direction.

Figure 4:
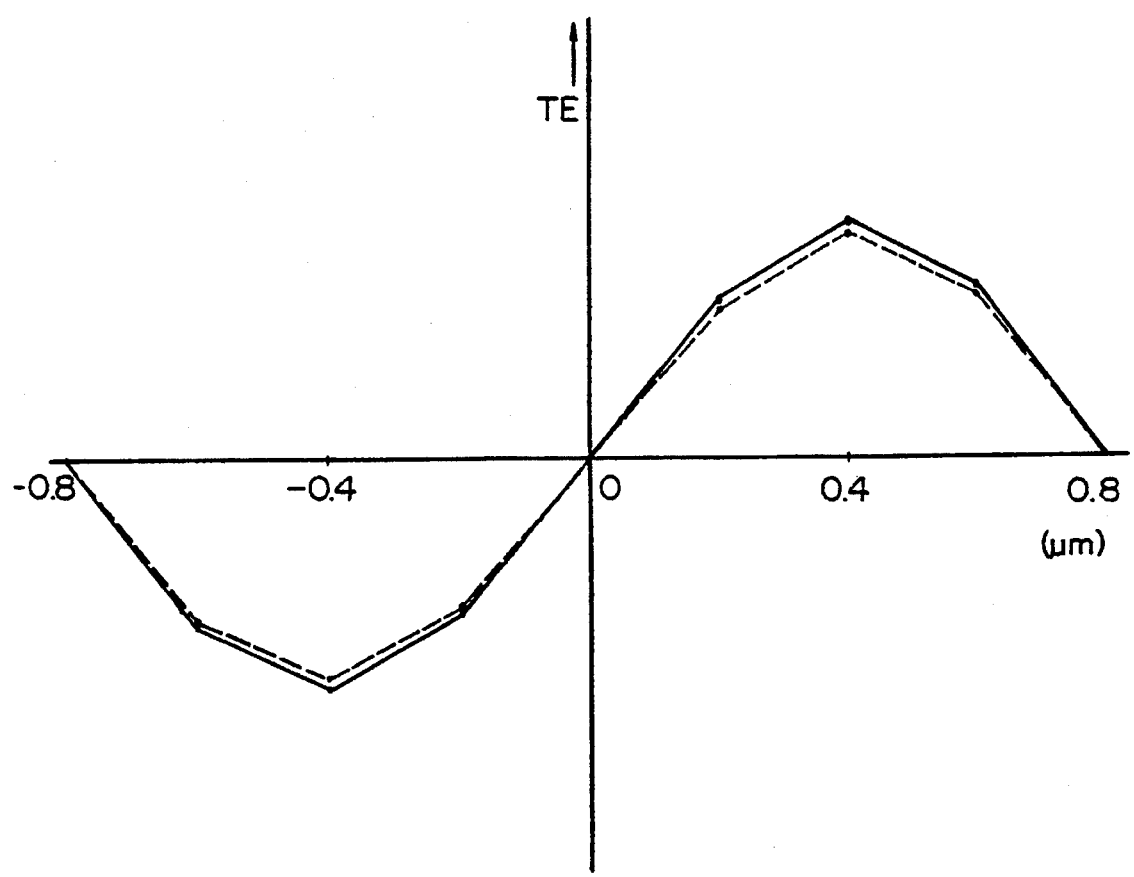
FIG. 4 is a graph of a tracking error signal.

FIG. 4 is a graph showing the positional relationship of the spot and the tracks on the disk, and its correspondence with the tracking error signal. The horizontal axis is the shift amount of the center of the spot on the optical disk from the center of a track, and the vertical axis is the tracking error which is output. The solid line in the figure shows the tracking error signal when the light beam is reflected vertically by the optical disk, and the broken line shows the tracking error when the mirror 3 is inclined so as to shift the spot on the optical disk by 10 tracks from the aforesaid track.

Even if the optical disk and the light beam are inclined to one another, there is practically no variation of the tracking error signal, so the spot on the optical disk can be positioned accurately in the center of a track by rotating the mirror 3 in the direction of the arrow in FIG. 1 according to the tracking error signal which is detected.

In the aforesaid description, only the case has been described wherein a photodetector is provided to detect the tracking error signal, but it is well known in the art that in an actual apparatus, a photodetector to reproduce a recording signal and a photodetector to detect a focusing error signal may also be provided.

Further, the theoretical basis for the relation between the aberration of the incident light beam and the intensity distribution on the photodetector will be given later.

EMBODIMENT 2

Figure 5:
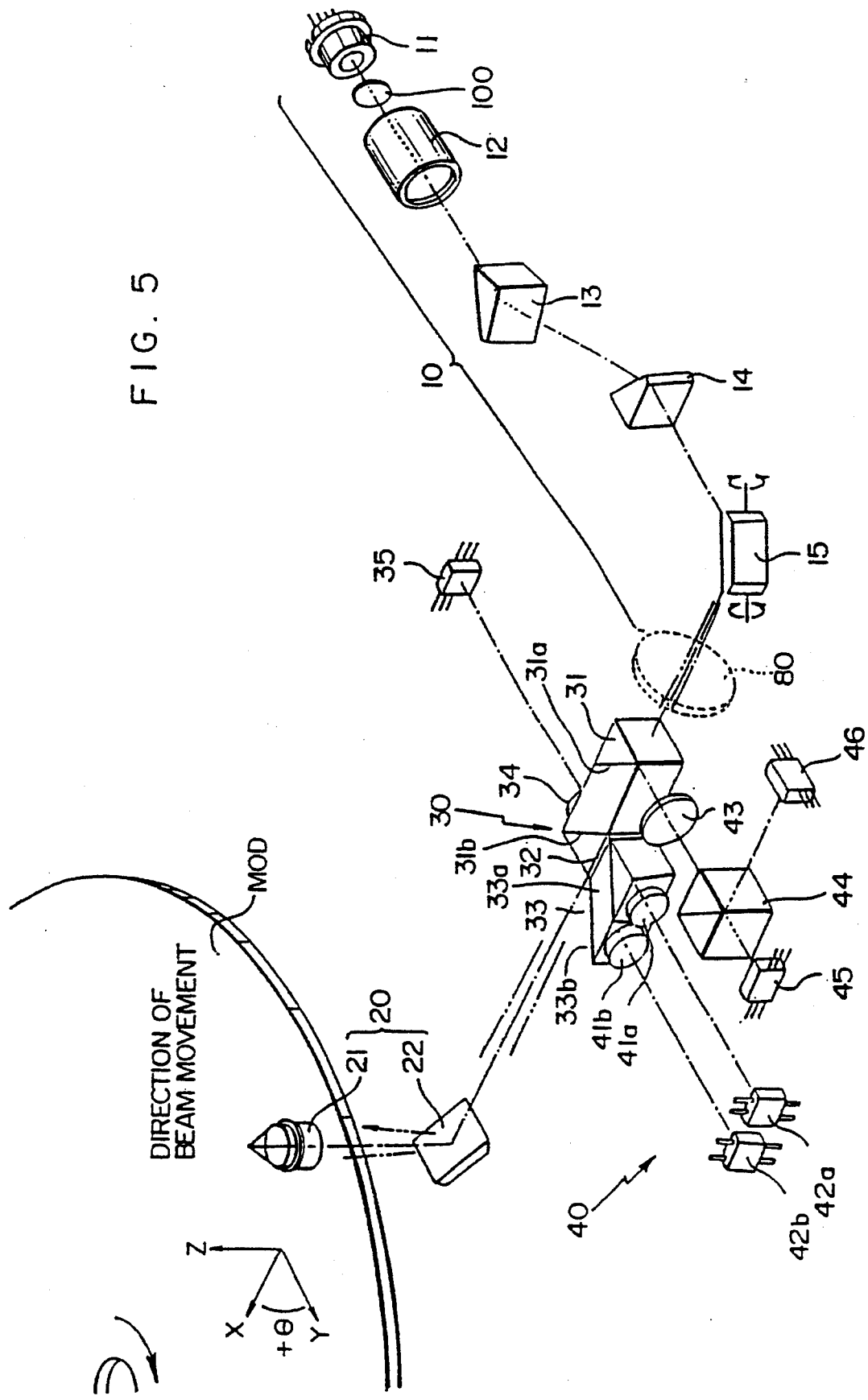
FIG. 5 is a schematic diagram of an optical system of a second embodiment.

FIGS. 5–7 illustrate a second embodiment wherein this invention is applied to an information recording and reproduction apparatus using an magneto-optic disk.

According to this embodiment, in order to make the head more lightweight so as to speed up access, the objective lens, mirror and an actuator that focuses by driving this objective lens in the direction z of the optic axis are installed in a head, and the spot is moved in the radial direction by a galvanic mirror installed in a fixed part of the apparatus.

In this arrangement, however, the distance between the mirror and the optical disk is greater than the apparatus of Embodiment 1, and if the mirror is inclined so as to shift the spot on the optical disk in the radial direction, the spot on the photodetector is displaced more than in the apparatus of Embodiment 1. The elimination of offset is therefore more important in Embodiment 2 than in the apparatus of Embodiment 1.

In the apparatus of this embodiment, a light beam having a wavefront aberration represented by an odd function is caused to be incident on an optical disk, and tracking error and focusing error signals are detected using two sets of photodetectors whose light detecting areas are divided into three regions by a boundary line corresponding to the radial direction of the optical disk.

The overall construction of the optical system will first be described.

In this optical system, as shown in FIG. 5, there are provided a light source unit 10, an objective optical system 20, a prism block 30 and a signal detecting optical system 40. The light source unit 10 comprises a semiconductor laser 11 generating a divergent light beam, a flat plate 100 with parallel surfaces which confers a wavefront aberration represented by an odd function on the laser light, a collimator lens 12 for converting the divergent light beam to a parallel light beam, two anamorphic prisms 13, 14 for shaping the sectional shape of the light beam, and a galvanic mirror 15. The light source unit 10 generates a parallel beam of circular cross-section. The galvanic mirror 15 is free to rotate so as to displace the spot on the optical disk in the radial direction.

The objective optical system 20 comprises an objective lens 21 which converges a light beam on the signal recording surface of an magneto-optic disk MOD and a mirror 22. The objective lens 21 and mirror 22 are installed in a head, not shown, which is free to slide in the radial direction of the magneto-optic disk MOD. On the other hand, the light source unit 10, the prism block 30 and the signal detecting optical system 40 are fixed. Further, the objective lens 21 is installed on an actuator in a head so that it can be driven in the direction z of the optic axis.

The prism block 30 comprises a first block 31 having two half mirror surfaces 31a, 31b, and a second block 33 having a polarizing separating surface 33a and a full reflecting surface 33b joined to the first block via a half wavelength plate 32.

The light beam from the light source unit 10 is partly reflected by the second half mirror surface 31a, and is condensed by a condensing lens 34 on a photodetector 35 for automatic regulation of the output of the semiconductor laser.

Part of the light beam reflected by the magneto-optic disk MOD is also reflected by the second half mirror surface 31b, and its polarization direction is rotated by 45° by the half wavelength plate 32. A P component passes through a polarization splitting surface 33a, and then passes via a condensing lens 41a to be condensed on a first photodetector 42a for detecting a magnetically recorded signal.

An S component, on the other hand, is reflected by the polarization splitting surface 33a and the full reflecting surface 33b, and passes via a condensing lens 41b to be condensed on a second photodetector 42b for detecting a magnetically recorded signal.

As the polarization direction of the laser beam incident on the magneto-optic disk MOD is rotated by a magnetic Kerr effect corresponding to the magnetization direction of the optical disk at the position where the spot forms an image, the recorded signal can be read by rotating the laser beam by 45° as described above, splitting it into two components P, S, and detecting these components by means of the separate photodetectors 42a, 42b so as to determine the intensity difference between them.

The part of the light reflected from the optical disk which has passed through the second half mirror 31b is reflected by the first half mirror surface 31a, converged by the condensing lens 43, divided by the beam splitter 44 and then detected by two photodetectors 45, 46 so as to detect an error signal. These photodetectors 45, 46 are, as shown in FIG. 6, disposed on either side of a point P which is in a conjugate position to the magneto-optic disk MOD when the system is focused. Further, as shown in FIG. 7, these photodetectors 45, 46 each have three regions A, B, C and D, E, F, respectively, divided by a boundary line corresponding to the radius of the optical disk on which the spot lies.

Figures 6A, 6B, 6C:
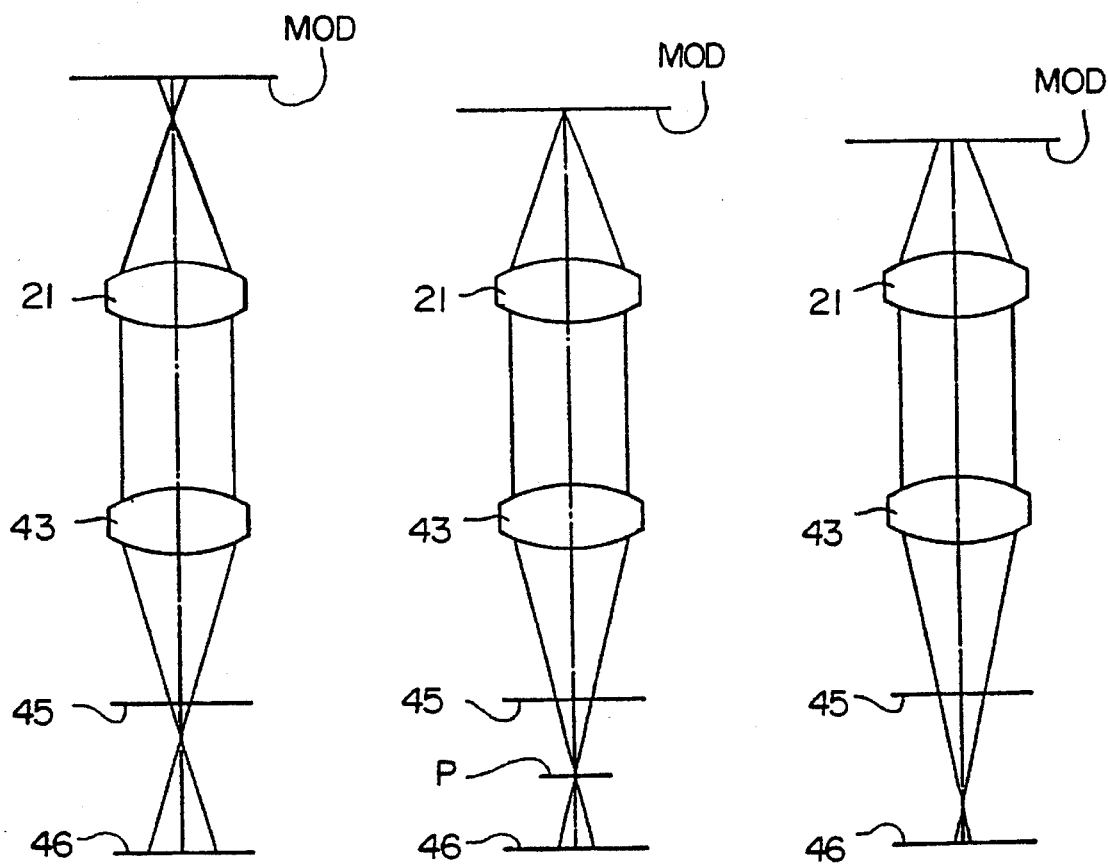
FIGS. 6(a), 6(b), 6(c) are schematic diagrams of the error detecting principle of the optical system illustrated in FIG. 5.
Figures 7A, 7B, 7C:
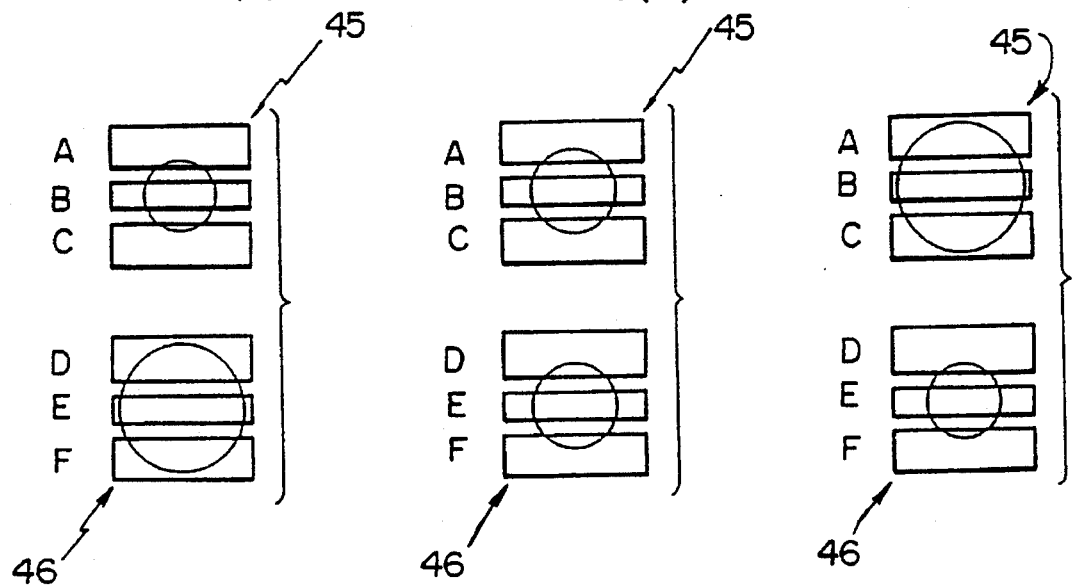
FIGS. 7(a), 7(b), and 7(c) are schematic diagrams illustrating the light detecting regions of the photodetector.

When the distance between the objective lens 21 and the magneto-optic disk MOD is varied as shown in FIG. 6(a), (b), (c), the size of the spot on each photodetector varies as shown in FIG. 7(a), (b), (c), respectively. FIG. 6(a) shows the situation when the optical disk is too far from the objective lens. FIG. 6(c) shows the situation when it is too near the objective lens.

A focusing error signal FE can therefore be detected by computing the outputs from the light receiving regions A, B, C, D, E and F according to the following equation:

$$FE=(A+B)-(D+F-E)$$

A focusing actuator, not shown, drives the objective lens 21 in the direction z of the optic axis based on this signal such that the focus of the lens coincides with the magneto-optic disk.

The intensity distribution of the spot formed on the photodetectors 45, 46 is asymmetrical in both the radial and tangential directions of the optical disk due to tracking error as in the case of the first embodiment. A tracking error signal TE may therefore be detected by computing the output of the photodetecting unit according to the following relation:

$$TE=(A+F)-(C+D)$$

As the spot on the photodetector is shifted only in a direction corresponding to the radial direction of the optical disk, even if the galvanic mirror is rotated so that the light beam is inclined to the magneto-optic disk, an accurate tracking error signal can be detected and an accurate tracking error computed from this relation.

The galvanic mirror 15 is controlled based on the tracking error signal so that the center of the spot on the optical disk coincides with the center of a track.

In this embodiment, we used the photodetectors 42a, 42b for detecting magnetically recorded signals which are separate from the photodetectors 45, 46 used for detecting an error. However, by inserting a half wavelength plate between the condensing lens 43 and the beam splitter 44, and using a polarizing beam splitter as the beam splitter 44, a magnetically recorded signal MO can be detected using the error detection photodetectors 45, 46 according to the following relation:

$$MO=(A+B+C)-(D+E+F)$$

Other means will now be described for generating a wavefront aberration which is an odd function. These means may be used individually to generate a wavefront aberration instead of the flat plate 100 with parallel surfaces shown in FIG. 5, but a plurality of means may also be used in combination with each other.

Figure 8:
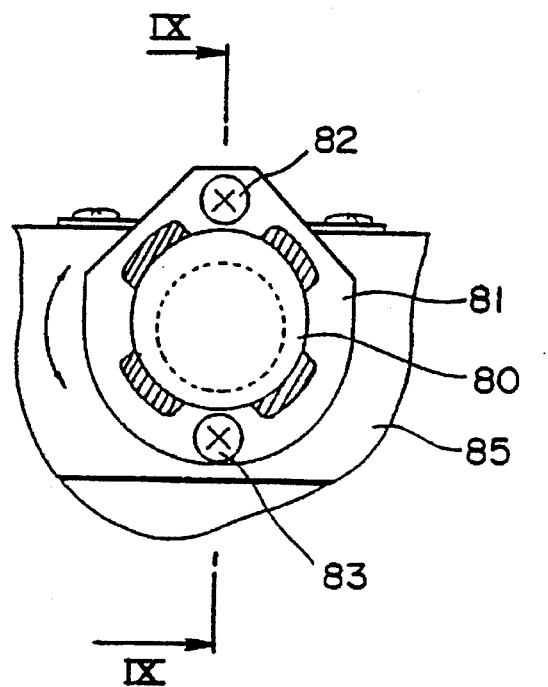
FIG. 8 is a plan view illustrating the assembled structure of an astigmatism generating device.
Figure 9:
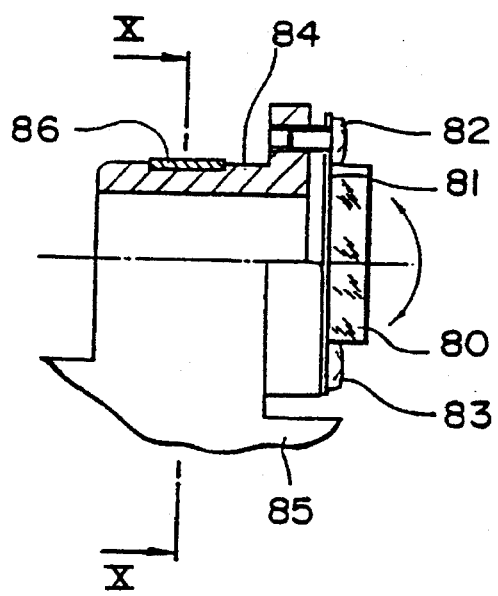
FIG. 9 is a section through a line IX—IX in FIG. 8.
Figure 10:
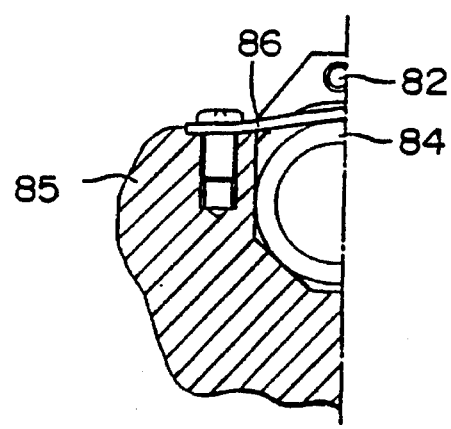
FIG. 10 is a section through a line X—X in FIG. 9.

FIGS. 8–10 are schematic diagrams for the purpose of describing an astigmatism generating device 80 interposed between the galvanic mirror 15 and the prism block 30 as shown by the broken line in FIG. 5.

The astigmatism generating device 80 is attached by means of adhesive to a flat spring 81, that is fixed by two screws 82, 83 to a holder 84. The holder 84 has a cylindrical axis, and is held in a groove provided in a base 85 by means of a keep plate 86.

The screw 82 is able to adjust the deformation of the astigmatism generating device 80. If the screw 82 is tightened, the flat spring 81 curves, thus causing the surface of the astigmatism generating device 80 to curve so as to generate a predetermined wavefront aberration. Further, if the keep plate 86 is loosened and the holder 84 is rotated about the optic axis, the direction of the aberration produced can be changed.

Thus, by adjusting the curvature and rotation angle of the astigmatism generating device 80, a wavefront aberration which is an odd function can be generated.

Nest, the effect of the shapes of the mirrors 15, 22 on the wavefront will be described.

Figure 11:
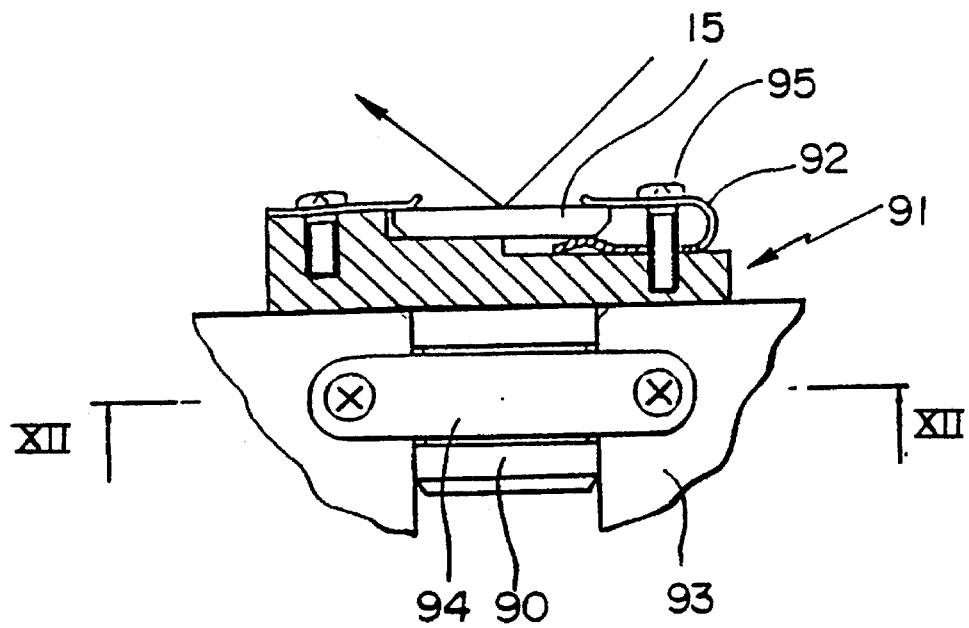
FIG. 11 is a sectional view illustrating an example of a mirror assembly.
Figure 12:
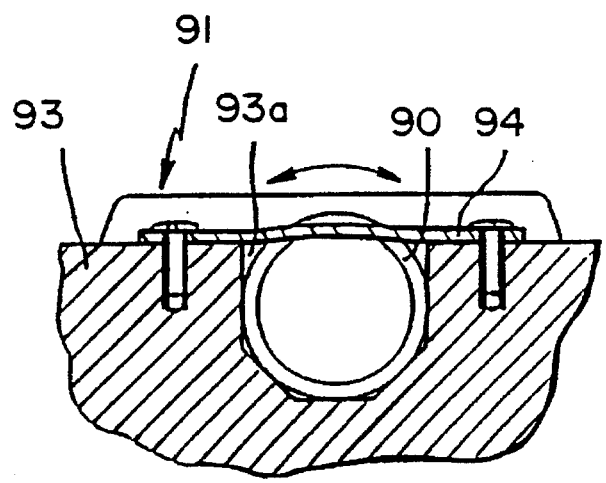
FIG. 12 is a section through a line XII—XII in FIG. 11.

FIGS. 11 and 12 concern a mechanism for holding the mirrors, i.e., for arbitrarily varying the amount of wavefront aberration generated by the mirrors. The mirror 15 is held by means of a spring clip 92 attached to a holder 91 having an axial portion 90. As shown in FIG. 12, the axial portion 90 is disposed in a groove 93a provided in a base 93, and it is held in place in the upper part of the figure by a flat spring 94 screwed to the base 93.

One of the screws 95 which screws into the holder 91 is a deformation adjusting screw. By tightening this screw 95, the stress on the mirror 15 can be varied and a deformation can be given to the surface. Further, as the direction of the deformation produced by this screw 95 is fixed, the holder 91 is rotated when it is desired to change the direction.

Figure 13:
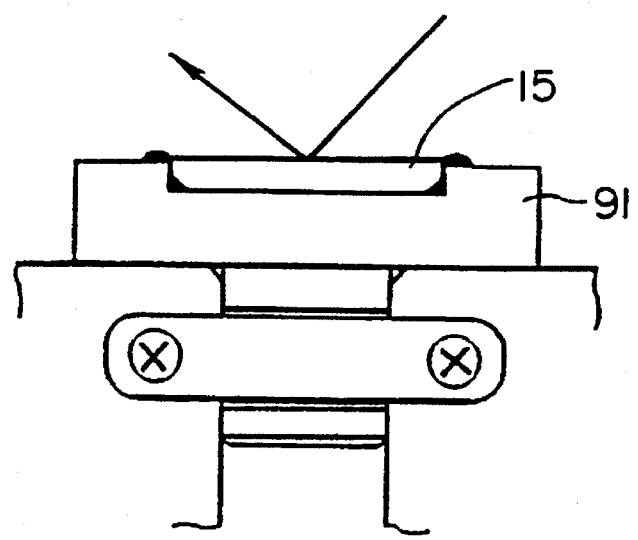
FIG. 13 is a plan view illustrating another example of a mirror assembly.

FIG. 13 shows an example wherein the mirror 15 is fixed by adhesion to the holder 91. In this example, a deformation of the surface is produced and a wavefront aberration is generated by locally varying the quantity of adhesive in the fixing process.

Figure 14:
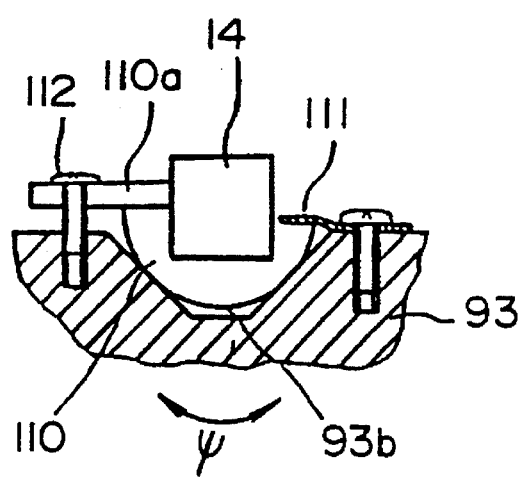
FIG. 14 is a sectional view illustrating a prism holding mechanism.

FIG. 14 concerns a mechanism for holding the anamorphic prism 13 or 14. The prism 14 is attached in a groove 93b of a Y-shaped base 93 via a semi-circular holder 110. One end of the holder 110 is elastically attached by means of a flat spring 111, and the other end is fixed to the base 93 by a screw 112 via an adjusting plate 110a fixed to the holder 110. By rotating this screw 112, the holder 110 is rotated and the prism 14 can thereby be rotated in a direction $\psi$ about the optic axis. Further, by varying the distance between the semiconductor laser 11 and the collimator lens 12, astigmatism in the rotation direction can also be corrected.

Next, the effect of the aberration of the incident light beam on the intensity distribution of the reflected light will be analyzed. To perform this analysis, the following 5 assumptions will be made:

The first assumption is that a Fourier analysis can be applied.

the second assumption is that the intensity can be found by analyzing only zero order and ±1st order diffracted light, and that diffracted light of higher orders can be neglected. The amount of diffracted light of second and higher orders is much less than the amount of first order diffracted light, and as almost none of this light returns to the pupil in an actual optical disk, such an assumption does not interfere in any way with a reasonable analysis.

The third assumption is that the magneto-optic disk can be considered as a phase type diffraction grating with one dimensional symmetry. This implies that the diffraction efficiency is the same for +1st order diffracted light and −1st order diffracted light, and also that the phase difference between +1st order diffracted light and zero order diffracted light, is the same as the phase difference between −1st order diffracted light and zero order diffracted light when the spot on the disk coincides with the center of a track.

Figure 17:
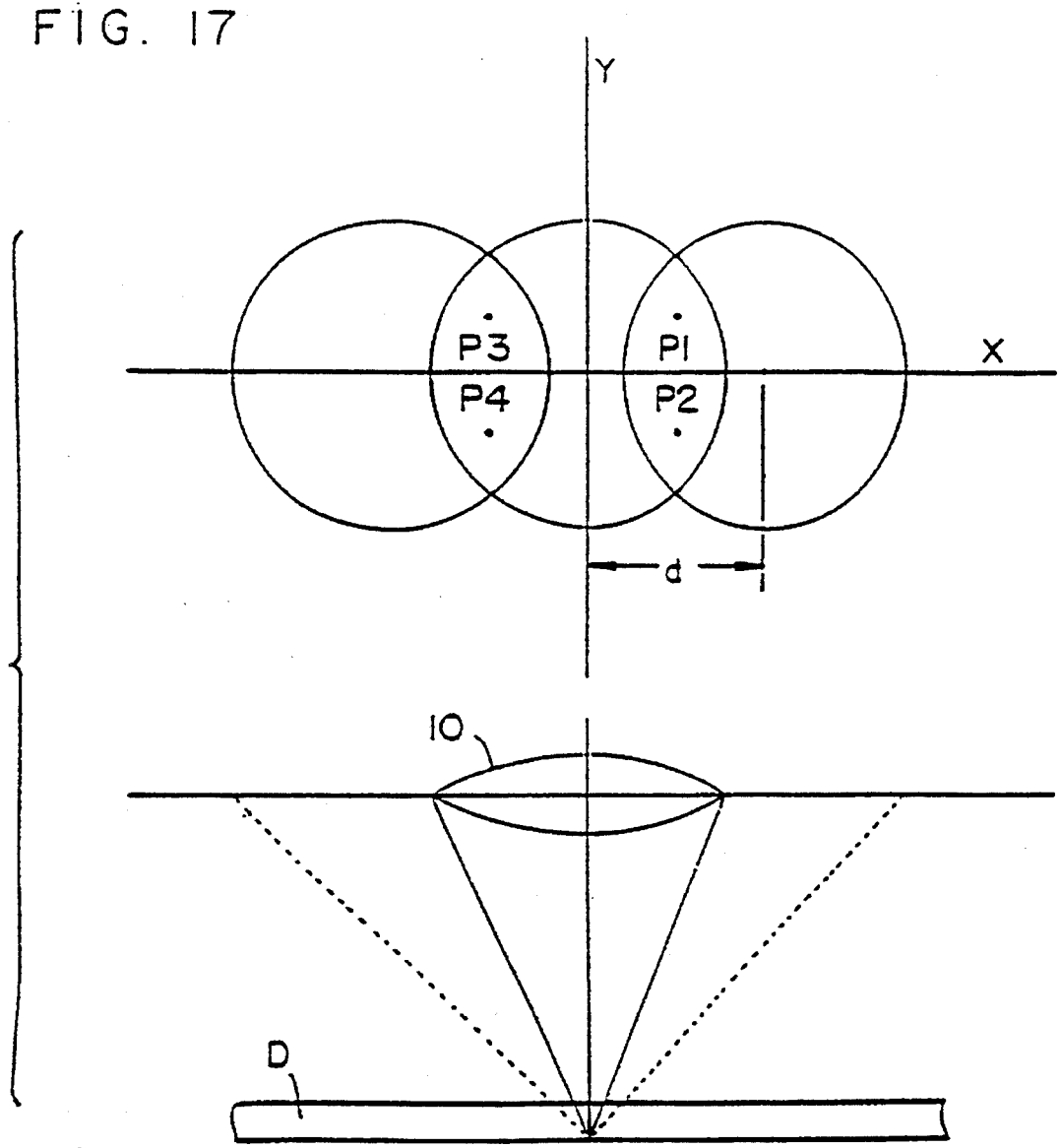
FIG. 17 is a schematic diagram illustrating the intensity of the reflected light on the pupil of an objective lens.

The fourth assumption is that returning light can be represented by four points on the pupil of the objective lens, i.e., P1, P2, P3 and P4 in FIG. 17. The points P1, P2 are more important for zero order and +1st order diffracted light, while the points P3, P4 are more important for zero order and −1st order diffracted light. These points are symmetrically placed with respect to the X and Y axes corresponding to the tangential and radial directions of the optical disk.

The fifth assumption is that the intensity distribution of incident light is constant.

If the above assumptions are true, and if the amplitude of zero order diffracted light from the optical disk is "a", the amplitude of ±1st order diffracted light from the optical disk is "b", the phase difference of ±1st order with respect to zero order diffracted light is "P", the position of the beam with respect to the center of the track is "x" when the distance between track centers is normalized to $2\pi$, and the amount of wavefront aberration at points (X, Y) on the pupil of the objective lens is W (X, Y), the amplitudes $A_1$, $A_0$ and $A_{-1}$ of +1st, zero and −1st order diffracted light are represented by:

| | |
|---|---|
| $A_1 = be^{1[P+x-W(X-d, Y)]}$ | 1st order diffraction |
| $A_0 = ae^{1W(X, Y)}$ | zero order diffraction |
| $A_{-1} = be^{1[P-x+W(X+d, Y)]}$ | −1st order diffraction |

In these relations, "d" is the distance from the optic axis to the center of ±1st order diffracted light on the pupil of the objective lens.

Further, if the wavefront aberrations at points P1, P2 P3, P4 are W1, W2, W3, W4, the amplitude AP1 and intensity I1 of light returning at the point P1, and the amplitude AP2 and intensity of light I2 returning at the point P2, are given by the relations:

$$AP1=ae^{1W1}+be^{1(P+x+W3)}$$

$$I1=a^2+b^2 2ab.\cos(P+x+W3-W1)$$

$$AP2=ae^{1W2}+be^{1(P+x+W4)}$$

$I2=a^2+b^2+2ab.\cos(P+x+W4-W2)$.

Similarly, the amplitude AP3 and intensity I3 of light returning at the point P3, and the amplitude AP4 and intensity of light I4 returning at the point P4, are given by the relations:

$AP3=ad^{1w3}+be^{1(P-x+w1)}$ $I3=a^2+b^2+2ab.\cos(P-x+W1-W3)$ $AP4=ad^{1w4}+be^{1(P-x+w2)}$ $I4=a^2+b^2+2ab.\cos(P-x+W2-W4)$ Relatively low order aberrations may be classified into the following four types depending on their symmetry with respect to the X and Y axes.

The first type are even function parameters with respect to both the X and Y axes, such as spherical aberration and astigmatism produced in the X, Y directions on the pupil (drawn out in the x, y axial directions depending on the focusing points on the optical disk).

The second type are odd function parameters with respect to the X axis and even function parameters with respect to the Y axis, such as inclination of the wavefront appearing in the Y direction on the pupil (the focusing point on the optical disk moves in the y direction), and coma appearing in the Y direction (tailing in the y direction on the optical disk).

The third type are even function parameters with respect to the X axis and odd function parameters with respect to the Y axis, such as inclination of the wavefront appearing in the X direction on the pupil (the focusing point on the optical disk moves in the x direction), and coma appearing in the X direction (tailing in the x direction on the optical disk).

The fourth type are odd function parameters with respect to both the X and Y axes, such as astigmatism appearing in the ±45° directions with respect to the X, Y directions on the pupil (drawn out in the x, y axial directions depending on the focusing points on the optical disk).

Figure 18:
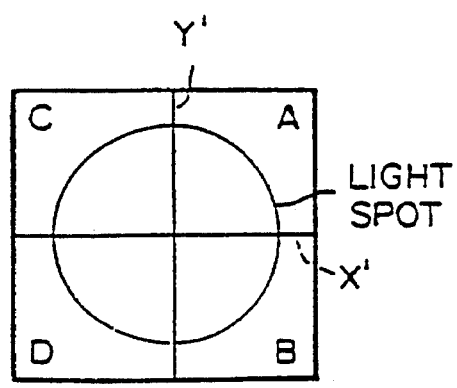
FIG. 18 is a schematic diagram illustrating the arrangement of light detecting regions of a photodetector.
Figure 19:
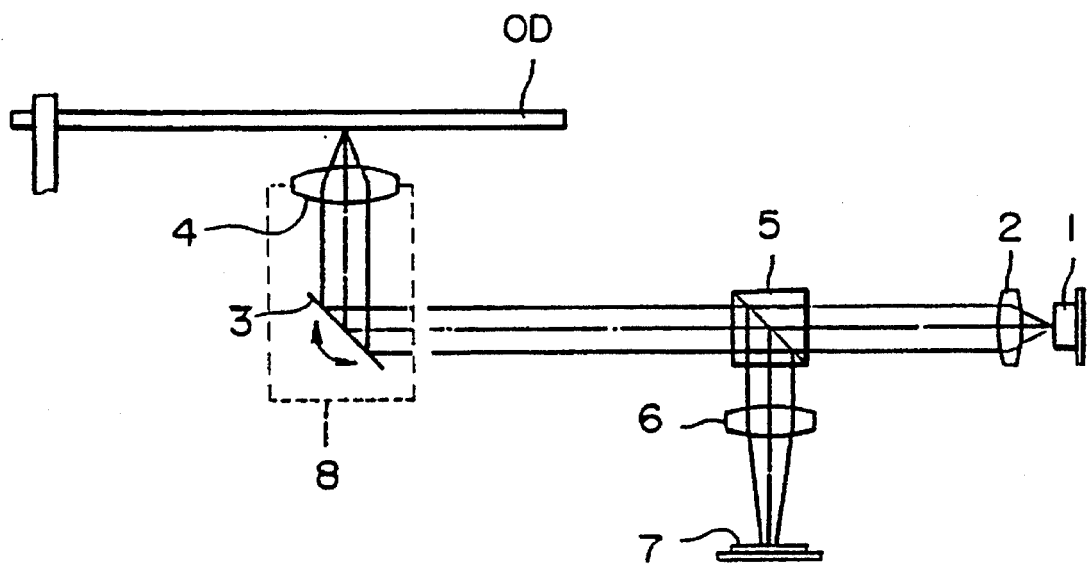
FIG. 19 is a schematic diagram of an optical system illustrating a conventional tracking error signal detector.
Figure 20:
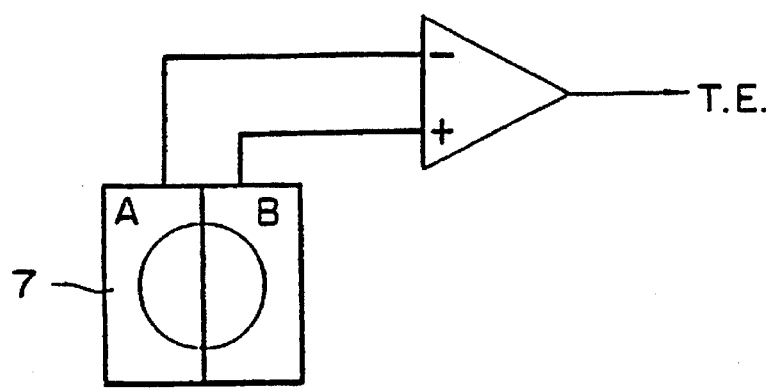
FIG. 20 is a schematic diagram illustrating the light detecting regions of a photodetector.
Figure 21A:
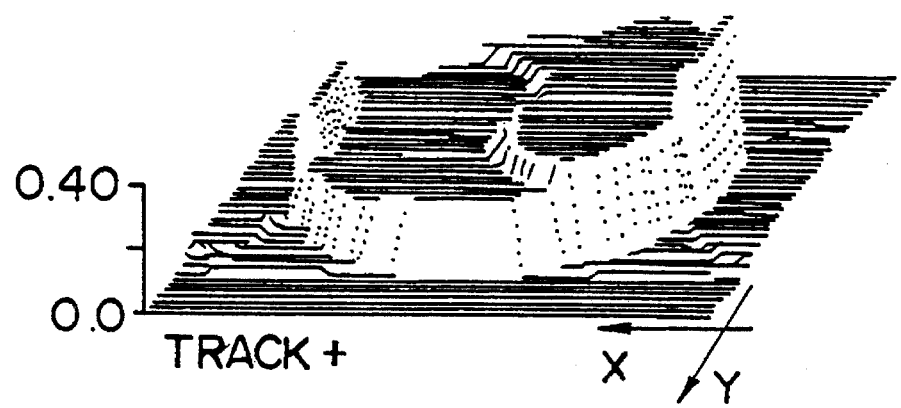
FIGS. 21(a), 21(b) and 21(c) are schematic diagrams illustrating the light distribution on a photodetector.
Figure 21B:
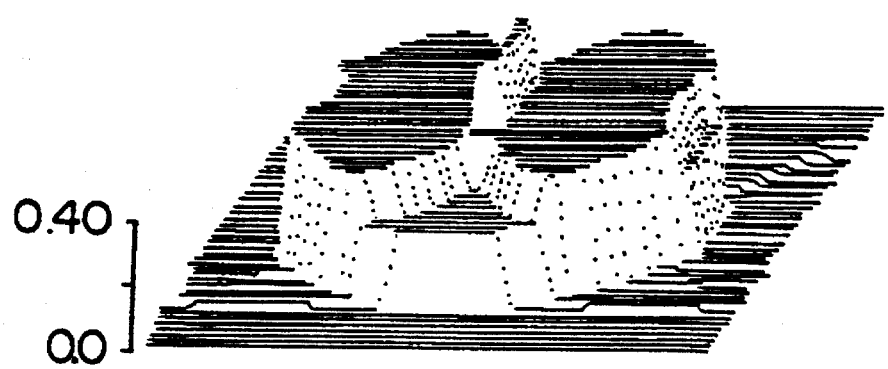
Figure 21C:
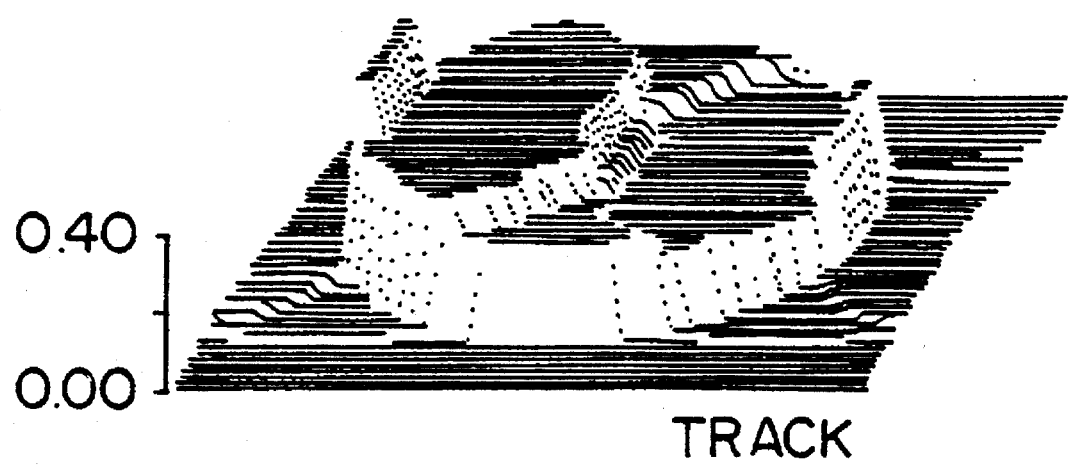
Figure 22:
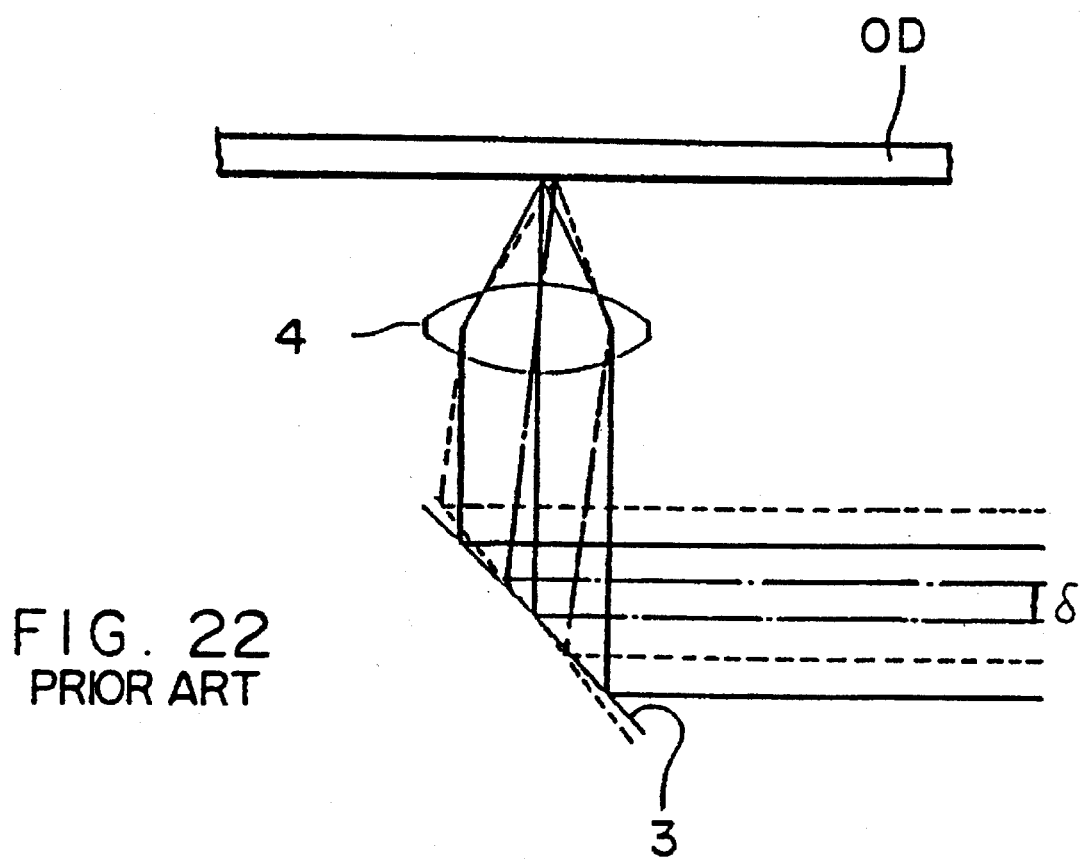
FIG. 22 is a schematic diagram illustrating the shift of reflected light when a light beam is inclined.
Figure 23:
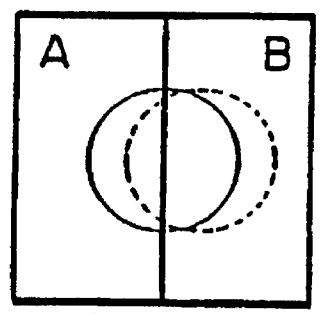
FIG. 23 is a schematic diagram illustrating the motion of a spot on the photodetector.
Figure 24:
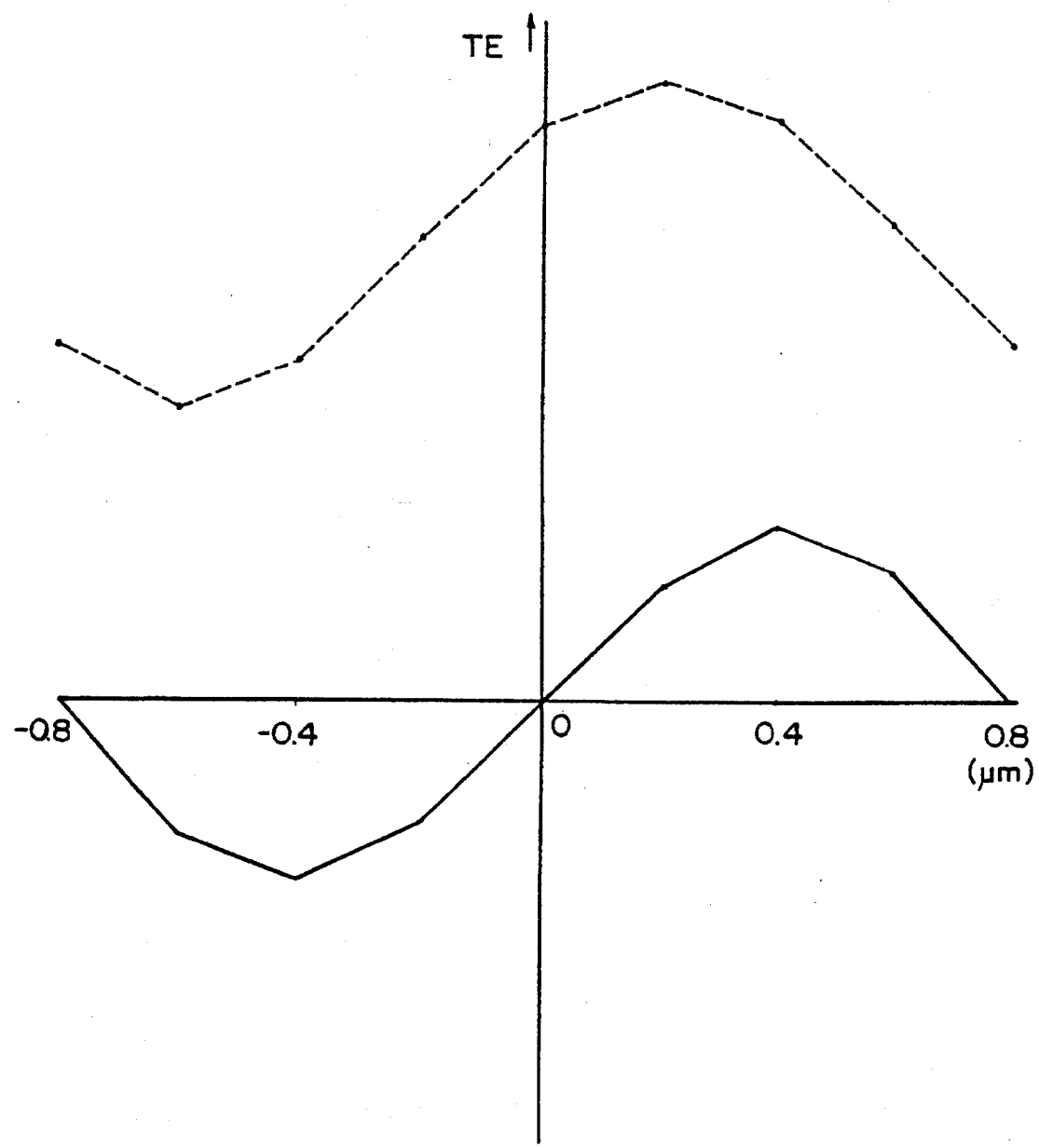
FIG. 24 is a graph illustrating a tracking error signal.

Next, the effect of these aberrations on signal detection will be described. As shown in FIG. 18, the light detecting area is divided into four regions A, B, C, D by a boundary line Y' in the tangential direction of the optical disk, and a boundary line X' in the radial direction. The intensities of these regions on the photodetector effectively correspond to the intensities I1, I2, I3, I4 on the pupil of the objective lens. The differential signal E1 from the regions divided by the boundary line Y' in the tangential direction (tracking error signal obtained by the usual push-pull method), the differential signal E2 from the regions divided by the boundary line X' in the radial direction, and the focusing error signal FE obtained by the astigmatism method, are respectively given by the following relations:

$E1=(I1+I2)-(I3+I4)$ $E2=(I1+I3)-(I2+I4)$ $FE1=(I1+I4)-(I2+I3)$

If there is an aberration present which is an even function with respect to both the X and Y axes, W1=W2=W3=W4 due to symmetry, and the intensities at each point are then given by:

$I1=I2=a^2+b^2+2ab.\cos(P+x)$ $I3=I4=a^2+b^2+2av.\cos(P-x)$

The intensity is therefore not a function of the aberration, and the differential signals are given by:

$E1=-8ab.\sin(x).\sin(P)$ $E=0$ $FE=0$

The tracking error signal obtained by the push-pull method is therefore unaffected by aberration, and the differential signal E2 and focusing error signal FE are not generated.

If there is an aberration present which is an odd function with respect to the X axis and an even function with respect to the Y axis, W1=-W2=W3=-W4 due to symmetry, and the intensities at each point are then given by:

$I1=I2=a^2+b^2+2ab.\cos(P+x)$ $I3=I4=a^2+b^2+2ab.\cos(P-x)$

As in the previous example, the intensity is therefore not a function of the aberration, and the differential signals are given by:

$E1=-8ab.\sin(x).\sin(P)$ $E2=0$ $FE=0$

If there is an aberration present which is an even function with respect to the X axis and an odd function with respect to the Y axis, W1=W2=-W3=-W4 (=W) due to symmetry, and the intensities at each point are then given by:

$I1=I2=a^2+b^2+2ab.\cos(P+x-2W)$ $I3=I4=a^2+b^2+2ab.\cos(P-x-2W)$

The intensity is therefore a function of the aberration, and the differential signals are given by:

$E1=-8ab.\sin(x-2W).\sin(P)$ $E2=0$ $FE=0$

The tracking error signal obtained by the push-pull method is thus affected by aberration so that its phase is shifted by 2W, but the differential signal E2 and the focusing error signal are not generated.

If there is an aberration present which is an odd function with respect to both the X and Y axes, W1=-W2=W3=-W4 (=W) due to symmetry, and the intensities at each point are then given by:

$I1=a^2+b^2+2ab.\cos(P+x-2W)$ $I2=a^2+b^2+2ab.\cos(P+x+2W)$ $I3=a^2+b^2+2ab.\cos(P-x+2W)$ $I4=a^2+b^2+2ab.\cos(P-x-2W)$ The intensity is therefore a function of the aberration, and the differential signals are given by:

$E1=-8ab.\sin(x).\sin(P).\cos(2W)$ $E2=8ab.\sin(x).\sin(P).\cos(2W)$ $FE=8ab.\sin(x).\sin(P).\cos(2W)$ When the spot on the optical disk moves away from the center of a track, the tracking error E1 obtained by the push-pull method is decreased in the proportion of cos 2W due to the effect of aberration, the differential signal E2 increases by sin 2W, and the focusing error signal FE obtained by the astigmatism method increases in the proportion of sin 2W. The phase of the differential signal E2 is the same as that of the signal E1, while the phase of the focusing error signal is 90* different to that of the signal E1.

From the above analytical results, it can be understood that a differential signal E2 is output only when the light beam has an aberration which is an odd function with respect to both the X and Y axes, and that other aberrations do not generate this signal. By giving the incident light beam an aberration which is an odd function with respect to both the X and Y aces, it is thus possible to detect a tracking error based on the differential signal E2.

However, if the light beam has an aberration which is an odd function with respect to both the X and Y axes, noise is superimposed on the focusing error signal FE when the spot is moved horizontally across the tracks. In this specification, this noise is defined as F/T (focus/track) crosstalk. when F/T crosstalk is produced, a focusing error signal is generated as if the objective lens were out of focus whenever the objective lens is in focus. Whenever the spot moves horizontally across the tracks, therefore, the objective lens is automatically driven by the mechanism in the direction of the optic axis although it is actually focused.

To avoid F/T crosstalk, either the focusing error may be detected by a method other than the astigmatism method, or an optical disk may be designed such that P=Nπ (where N is an integer and P is the phase difference).

In the former case, there is a method of detecting the focusing error from the beam width as in the aforesaid second embodiment. According to this method, F/T crosstalk is not produced even if the light beam has a wavefront aberration, and the focusing error signal can be detected accurately.

Next, two examples of optical disks which satisfy the condition P=Nπ (where N is an integer) will be described. If P=Nπ, F/T crosstalk is not produced even if focusing error is detected by the astigmatism method.

Figure 15:
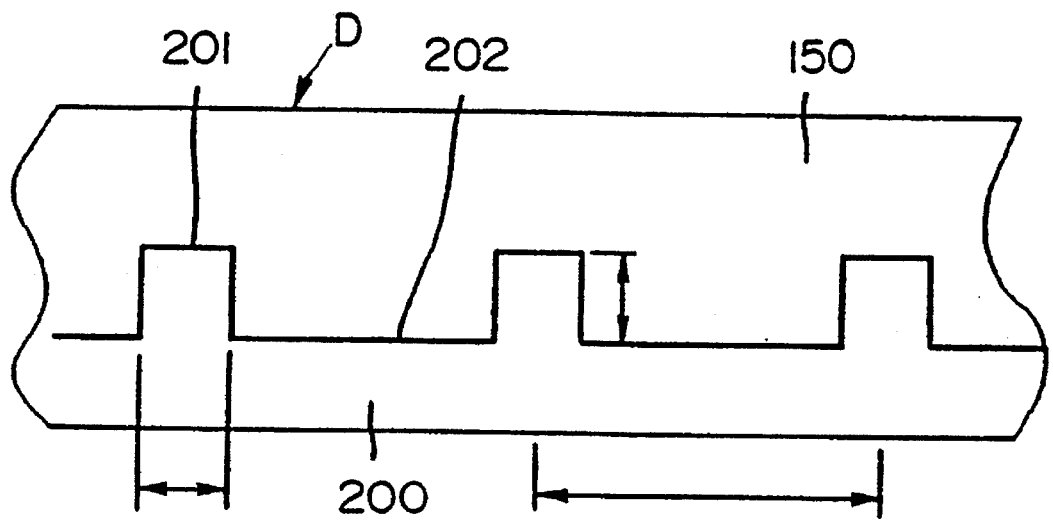
FIG. 15 is a sectional view illustrating the structure of an optical disk according to this embodiment.

As shown in FIG. 15, an optical disk D comprises a transparent resin layer 150 and a recording layer 200. A light beam is incident from the transparent layer 150 in the upper part of the figure, and is reflected by the recording layer 200. Tracks or grooves 201 are formed at a predetermined distance apart in the recording layer, the land 202 between these tracks or grooves 201 constituting information recording tracks. The optical disks currently in general use have a track or groove pitch (distance between the centers of adjacent tracks) of 1.6 μm.

As shown in FIG. 15, if the sectional shape of the tracks 201 is rectangular wherein the base length of the rectangle is 0.3 μm, and the refractive index of the transparent layer 150 is "n," P= Nπ when the depth H of the tracks is λ/4n. If λ=780 nm and n=1.59, then H=0.12 μm.

Figure 16:
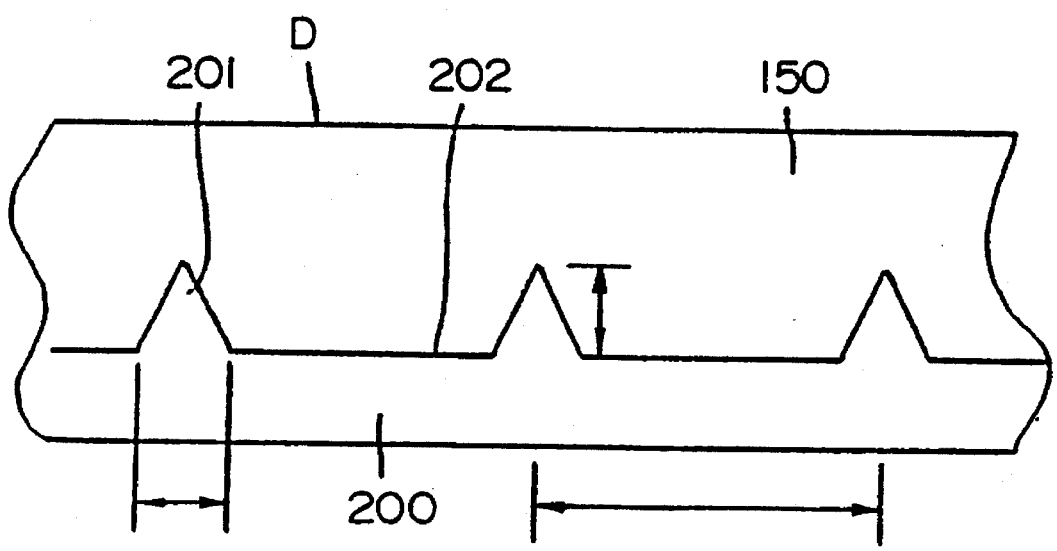
FIG. 16 is a sectional view illustrating the structure of another optical disk according to this embodiment.

Further, as shown in FIG. 16, if the sectional shape of the tracks 201 is triangular wherein the base length of the triangle is 0.3 μm, P=Nπ when the depth H is 1.83 λ/4n. If λ=780 nm and n-32 1.59, then H=0.22 μm.

As used herein, the terms "odd function" and "even function" are mathematical terms having the following definitions:

an "odd function" is defined as a function f(x), of a variable x, for which f(−x)=−f(x).

an "even function" is defined a function f(x), of a variable x, for which f(−x)=f(x).

For example, sin x and $x^3$ are odd functions of x, while cos x and $x^2$ are even functions.

Further, as used in the present application, the terms "drawn out" and "tailing" means long and narrow or elongated.

What is claimed is:

1. A magneto-optic disk adapted to reflect a light beam, comprising:

a recording layer for recording data on said magneto-optic disk, said recording layer comprising a plurality of grooves spaced predetermined distances apart from one another and a plurality of data recording land areas formed between each of said grooves; and a transparent layer which covers an outer surface of said recording layer;

said grooves being arranged as diffracting means for diffracting the light beam such that a phase difference of first order diffracted light with respect to zero order diffracted light in the reflected light beam is equal to Nπ, where N is an integer.

2. The optical disk according to claim 1, wherein a sectional shape of each of said grooves is rectangular.

3. The optical disk according to claim 2, wherein a distance between the centers of adjacent grooves is 1.6 μm, a base length of each of said grooves is 0.3 μm, and a depth of each of said grooves is λ/4n, where λ is the wavelength of the light beam and n is the refractive index of said transparent layer.

4. The optical disk according to claim 3, wherein the depth of each of said grooves is 0.12 μm, the wavelength λ is 780 nm and the refractive index n is 1.59.

5. The optical disk according to claim 1, wherein a sectional shape of each of said grooves is triangular.

6. The optical disk according to claim 5, wherein a distance between the centers of adjacent grooves is 1.6 μm, a base length of each of said grooves is 0.3 μm, and a depth of each of said grooves is 1.83.λ/4n, where λ is the wavelength of the light beam and n is the refractive index of said transparent layer.

7. The optical disk according to claim 6, wherein the depth of each of said grooves is 0.22 μm, the wavelength λ is 780 nm and the refractive index n is 1.59.

* * * * *

UNITED STATES PATENT AND TRADEMARK OFFICE
CERTIFICATE OF CORRECTION

PATENT NO. : 5,500,849
DATED : March 19, 1996
INVENTOR(S) : Masato NOGUCHI

It is certified that error appears in the above-indentified patent and that said Letters Patent is hereby corrected as shown below:

At column 12, line 48 (claim 6, line 4) change "$1.83.\lambda/4n$" to ---$1.83\cdot\lambda/4n$---.

Signed and Sealed this

Fifteenth Day of April, 1997

*Attest:*

BRUCE LEHMAN

*Attesting Officer*     *Commissioner of Patents and Trademarks*